US010221620B2

(12) United States Patent
Michel et al.

(10) Patent No.: US 10,221,620 B2
(45) Date of Patent: Mar. 5, 2019

(54) HOME-AUTOMATION EQUIPMENT FOR CLOSURE OR SOLAR PROTECTION AND METHOD FOR RECHARGING A BATTERY FOR SUCH EQUIPMENT

(71) Applicant: SOMFY ACTIVITES SA, Cluses (FR)

(72) Inventors: Florent Michel, Chomerac (FR); Didier Menetrier, Marignier (FR)

(73) Assignee: SOMFY ACTIVITES, Cluses (FR)

(*) Notice: Subject to any disclaimer, the term of this patent is extended or adjusted under 35 U.S.C. 154(b) by 0 days.

(21) Appl. No.: 15/744,427

(22) PCT Filed: Aug. 26, 2016

(86) PCT No.: PCT/EP2016/070201
§ 371 (c)(1),
(2) Date: Jan. 12, 2018

(87) PCT Pub. No.: WO2017/036966
PCT Pub. Date: Mar. 9, 2017

(65) Prior Publication Data

US 2018/0202221 A1 Jul. 19, 2018

(30) Foreign Application Priority Data

Aug. 28, 2015 (FR) ..................................... 15 58009

(51) Int. Cl.
*E06B 9/68* (2006.01)
*E06B 9/322* (2006.01)
(Continued)

(52) U.S. Cl.
CPC ................ *E06B 9/322* (2013.01); *E06B 9/32* (2013.01); *E06B 9/323* (2013.01); *E06B 9/68* (2013.01);
(Continued)

(58) Field of Classification Search
CPC . E06B 9/322; E06B 9/323; E06B 9/70; E06B 9/72; E06B 9/68; E06B 2009/6809;
(Continued)

(56) References Cited

U.S. PATENT DOCUMENTS 4,213,079 A * 7/1980 Mullersman .......... H01M 10/46 320/111
4,807,686 A * 2/1989 Schnebly ................ E06B 9/262 160/7

(Continued)

FOREIGN PATENT DOCUMENTS

WO 2006/091303 A1 8/2006

OTHER PUBLICATIONS

International Search Report, dated Nov. 10, 2016, from corresponding PCT/EP2016/070201 application.

*Primary Examiner* — Katherine W Mitchell
*Assistant Examiner* — Johnnie A. Shablack
(74) *Attorney, Agent, or Firm* — Young & Thompson

(57) ABSTRACT

A home-automation equipment includes a concealing device including a screen, a holding device of the screen, a load bar, a motorized drive device and an autonomous electrical energy supply device. The motorized drive device includes an electromechanical actuator making it possible to raise and lower the screen. The supply device includes a battery positioned at the holding device, a first electrical connection element positioned at the load bar and configured to be connected to an external electrical supply source, so as to recharge the battery, and a second electrical connection element positioned at the holding device. The second element cooperates with the first element only when the screen is in a recharging position of the battery, so as to establish an electrical connection between the first element and the battery.

12 Claims, 4 Drawing Sheets

(51) Int. Cl.
*E06B 9/32* (2006.01)
*E06B 9/323* (2006.01)
*E06B 9/70* (2006.01)

(52) U.S. Cl.
CPC ........ *E06B 9/70* (2013.01); *E06B 2009/6809* (2013.01)

(58) Field of Classification Search
CPC ............... H01M 10/44; H01M 10/441; H01M 2220/00; H01M 2220/10; H02J 7/0042; H02J 7/355
USPC ......................................... 160/168.1 P, 84.02
See application file for complete search history.

(56) References Cited

U.S. PATENT DOCUMENTS 5,262,710 A * 11/1993 Taylor ................... H02J 7/0042 320/110
5,523,666 A * 6/1996 Hoelzl ..................... B60K 1/04 320/109
5,793,174 A * 8/1998 Kovach ................... E06B 9/262 318/16
6,736,186 B2 * 5/2004 Anderson ................. E06B 9/32 160/168.1 P
6,984,951 B2 * 1/2006 Osinga ................ E04F 10/0659 318/400.08
7,264,034 B2 * 9/2007 Lin ........................... E06B 9/32 160/168.1 P
7,389,806 B2 * 6/2008 Kates ........................ E06B 9/32 160/5
7,418,313 B2 * 8/2008 Devis ...................... E05F 15/40 318/626
8,253,288 B2 * 8/2012 Lagarde .................... E06B 9/72 310/77
8,581,163 B2 * 11/2013 Grehant .................... E06B 9/32 250/203.4
8,813,809 B2 * 8/2014 Braggs ................... A47H 99/00 160/330
8,853,973 B2 * 10/2014 Lagarde .................... E06B 9/68 160/310
8,944,845 B2 * 2/2015 Yu ........................ H01R 13/447 439/171
9,054,540 B2 * 6/2015 Wu ....................... H02J 7/0045
9,080,382 B2 * 7/2015 Lagarde ..................... E06B 9/68
9,533,587 B2 * 1/2017 Krammer ............ B60L 11/1818
9,647,470 B2 * 5/2017 Shripathy ............. H02J 7/0042
9,702,190 B2 * 7/2017 Schneider ................. E06B 9/72
9,722,220 B2 * 8/2017 Lemaitre ................. H01M 2/10
9,909,364 B2 * 3/2018 Cavarec .................... E06B 9/68
2003/0168188 A1 * 9/2003 Wen ........................ E06B 9/308 160/168.1 P
2007/0107854 A1 * 5/2007 Jelic .......................... E06B 9/30 160/170
2008/0150461 A1 * 6/2008 Adamus .................... E06B 9/42 318/446
2008/0185990 A1 * 8/2008 Hsu ..................... H01M 2/1022 320/103
2008/0236763 A1 * 10/2008 Kates ........................ E06B 9/32 160/5
2009/0193717 A1 * 8/2009 Ebbe .................. G07C 9/00309 49/324
2009/0308543 A1 * 12/2009 Kates ........................ E06B 9/44 160/5
2010/0154999 A1 * 6/2010 Oh .......................... E06B 9/322 160/7
2011/0036511 A1 * 2/2011 Dempwolffe ........... E06B 9/262 160/84.02
2012/0242279 A1 * 9/2012 Tso ....................... A47L 9/2852 320/107
2014/0176070 A1 * 6/2014 Krammer ............ B60L 11/1818 320/109
2014/0203764 A1 * 7/2014 Ireland .................. H02J 7/0042 320/107
2014/0305602 A1 * 10/2014 Kirby ........................ E06B 9/42 160/310
2015/0137770 A1 * 5/2015 Bencuya ............... H02J 7/0045 320/162
2015/0362896 A1 * 12/2015 Feldstein ............... G05B 11/01 700/275
2016/0258213 A1 * 9/2016 Cavarec .................. E06B 9/322
2016/0376842 A1 * 12/2016 Brondex ................... E06B 9/40 160/7
2017/0167193 A1 * 6/2017 Slivka ....................... E06B 9/72
2017/0218699 A1 * 8/2017 Mugnier ................... E06B 9/72
2017/0234066 A1 * 8/2017 Graybar .................. E06B 9/322 475/149
2017/0241200 A1 * 8/2017 Feldstein .................. E06B 9/68
2017/0245039 A1 * 8/2017 Chen ..................... H02J 7/0052
2017/0356243 A1 * 12/2017 Feldstein .................. E06B 9/68
2018/0106104 A1 * 4/2018 Carvalheiro .............. E06B 9/72
2018/0112463 A1 * 4/2018 Derk, Jr. ................... E06B 9/72
2018/0202224 A1 * 7/2018 Kumar ...................... E06B 9/42

* cited by examiner

HOME-AUTOMATION EQUIPMENT FOR CLOSURE OR SOLAR PROTECTION AND METHOD FOR RECHARGING A BATTERY FOR SUCH EQUIPMENT

BACKGROUND OF THE INVENTION

Field of the Invention

The present invention relates to a closure or solar protection home-automation equipment.

The present invention also relates to a method for recharging a battery for such closure or solar protection home-automation equipment.

In general, the present invention relates to the field of concealing devices comprising a motorized drive device setting a screen in motion between at least one first position and one second position.

A motorized drive device comprises an electromechanical actuator for a movable element for closing, blacking out or providing solar protection, such as a blind or any other equivalent material, hereinafter referred to as a screen.

Description of the Related Art

Document WO 2006/091303 A1 is already known, which describes a closure or solar protection home-automation equipment.

The concealing device comprises a housing, a winding tube, a screen, a load bar, a motorized drive device and an autonomous electrical energy supply device.

A first end of the screen is positioned at the housing. Additionally, a second end of the screen is fastened to the load bar.

The motorized drive device comprises an electromechanical actuator making it possible to raise and lower the screen, between a high position and a low position and, more particularly to wind and unwind the screen, between a wound position and an unwound position. The electromechanical actuator is electrically connected to the autonomous electrical energy supply device.

The autonomous electrical energy supply device comprises a battery. The battery is positioned at the housing of the concealing device and, more particularly, inside a winding tube of the screen. The battery comprises several rechargeable energy storage elements.

The autonomous electrical energy supply device comprises a first electrical connection element and a second electrical connection element.

The first electrical connection element is electrically connected to the battery by an electrical connection. The electrical connection between the first electrical connection element and the battery is implemented using a power supply cable extending along the screen and, more particularly, integrated into the fabric of the screen.

The first electrical connection element is positioned at the load bar of the concealing device and configured to be connected to an external electric supply source, so as to recharge the battery. The first electrical connection element is either an electrical connector, or a coil cooperating with another coil positioned at a threshold of an opening. In this way, the first electrical connection element can be electrically connected to a wall outlet of a power supply network.

The second electrical connection element is positioned at the housing of the concealing device. The electrical connection between the first electrical connection element and the battery is implemented through the second electrical connection element electrically connecting the power supply cable to the battery.

The power supply cable comprises a first part extending between the first electrical connection element and the second electrical connection element, as well as a second part extending between the second electrical connection element and the battery.

However, this home-automation equipment has the drawback of electrically connecting the first electrical connection element, positioned at the load bar of the concealing device, to the battery, positioned at the housing of the concealing device, using a power supply cable extending along the windable fabric of the screen and the second electrical connection element.

Thus, the power supply cable electrically connecting the first electrical connection element to the battery is wound with the screen around the winding tube, when the screen is moved toward the wound position.

In this way, the second electrical connection element, connecting the power supply cable to the battery, is subject to stresses exerted during the unwinding and the winding of the screen.

Consequently, the electrical connection between the first electrical connection element and the battery can be damaged during use of the home-automation equipment.

The integration of the power supply cable into the windable fabric of the screen may also cause damage to the latter during the unwinding and winding of the screen around the winding tube.

Furthermore, the integration of the power supply cable into the windable fabric is detrimental to the aesthetics of the screen.

Furthermore, the electrical connection between the power supply cable and the battery is complex to carry out, since the power supply cable is wound around the winding tube of the screen.

BRIEF SUMMARY OF THE INVENTION

The present invention aims to resolve the aforementioned drawbacks and to propose home-automation equipment for closure or solar protection making it possible to simplify an electrical connection between a first electrical connection element positioned at a load bar of a concealing device and a battery positioned at a housing of the concealing device, so as to be able to recharge the battery from an external electrical supply source, while guaranteeing the reliability of this electrical connection and minimizing the costs of obtaining the home-automation equipment.

In this respect, according to a first aspect, the present invention relates to home-automation equipment for closure or solar protection comprising a concealing device, the concealing device comprising at least:

a screen, a device for holding the screen, a first end of the screen being positioned at the holding device of the screen, a load bar, a second end of the screen being fastened to the load bar, a motorized drive device, and an autonomous electrical energy supply device, the motorized drive device comprising at least:

an electromechanical actuator making it possible to raise and lower the screen, between a high position and a low position, the electromechanical actuator being electrically connected to the autonomous electrical energy supply device, the autonomous electrical energy supply device comprising at least:

a battery, the battery being positioned at the holding device of the screen, a first electrical connection element, the first electrical connection element being positioned at the load bar of the concealing device, the first electrical connection element being configured to be connected to an external electrical supply source, so as to recharge the battery, and a second electrical connection element, the second electrical connection element being positioned at the holding device of the screen.

According to the invention, the second electrical connection element cooperates with the first electrical connection element only when the screen is in a recharging position of the battery, the recharging position of the battery corresponding either to the high position of the screen or to a position of the screen where the load bar is near the holding device of the screen, so as to establish an electrical connection between the first electrical connection device positioned at the load bar and the battery positioned at the holding device of the screen.

Thus, the electrical connection between the first electrical connection element, positioned at the load bar of the concealing device, and the battery, positioned at the holding device of the screen, is implemented only when the first electrical connection element is positioned near the second electrical connection element, so as to be able to recharge the battery.

In this way, the electrical connection between the first electrical connection element, positioned at the load bar, and the battery, positioned at the holding device of the screen, is implemented without a power supply cable connecting the first electrical connection element to the second electrical connection element, so as to guarantee the reliability of this electrical connection and to minimize the costs of obtaining the home-automation equipment.

Furthermore, the positioning of the first electrical connection element at the load bar of the concealing device makes it possible to facilitate, for the user, the electrical connection of the external electrical supply source to the first electrical connection element, since this electrical connection between the first electrical connection element and the external electrical supply source can be done when the screen of the concealing device is in the low position.

Moreover, the battery can be recharged without having to disassemble part of the home-automation equipment and, in particular, the holding device of the screen.

In a first embodiment, the first and second electrical connection elements comprise electrical contact elements, so as to establish electrical conduction between the first and second electrical connection elements, when the screen is in the recharging position of the battery.

In a second embodiment, the first and second electrical connection elements comprise coils, so as to establish electromagnetic coupling between the first and second electrical connection elements, when the screen is in the recharging position of the battery.

Advantageously, the first electrical connection element is mounted on the load bar of the concealing device by fastening elements.

Preferably, these fastening elements are holding elements bearing on walls of the load bar.

According to one preferred feature of the invention, the first electrical connection element comprises a centering element cooperating with a centering element of the second electrical connection element, so as to center the first electrical connection element relative to the second electrical connection element, in the assembled configuration of the concealing device and when the screen is in the recharging position of the battery.

According to another preferred feature of the invention, the first electrical connection element comprises a first part and a second part, the second part being movable relative to the first part.

Advantageously, the first and second parts of the first electrical connection element respectively comprise a recess cooperating with the load bar, the recesses of the first and second parts of the first electrical connection element forming at least part of the fastening elements of the first electrical connection element on the load bar of the concealing device.

Preferably, the first and second parts of the first electrical connection element are kept bearing on walls of the load bar using an elastic return element.

According to another preferred feature of the invention, the first electrical connection element comprises a centering element cooperating with a centering element of the load bar, so as to position the first electrical connection element relative to the load bar and to center the first electrical connection element relative to the second electrical connection element, in the assembled configuration of the concealing device.

According to a second aspect, the present invention relates to a method for recharging a battery for a home-automation equipment for closure or solar protection as set out above.

According to the invention, this method comprises at least the following steps:

lowering the screen toward the low position, connecting an external electrical supply source on the first electrical connection element, raising the screen to the recharging position of the battery, and making an electrical connection between the first and second electrical connection elements, so as to supply electrical energy to the battery from the external electrical supply source.

This method for recharging a battery has features and advantages similar to those previously described, relative to the home-automation equipment according to the invention.

BRIEF DESCRIPTION OF THE DRAWINGS

Other particularities and advantages of the invention will also appear in the description below, done in reference to the appended drawings, provided as non-limiting examples.

DETAILED DESCRIPTION OF THE PREFERRED EMBODIMENTS

Figure 1:
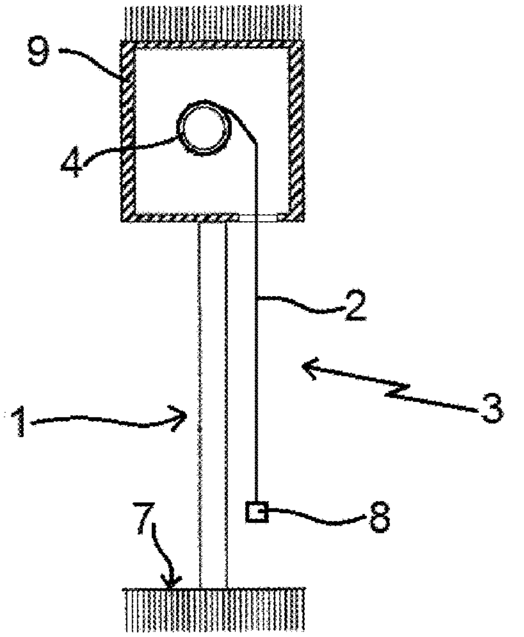
FIG. 1 is a cross-sectional schematic view of a home-automation equipment according to one embodiment of the invention.
Figure 2:
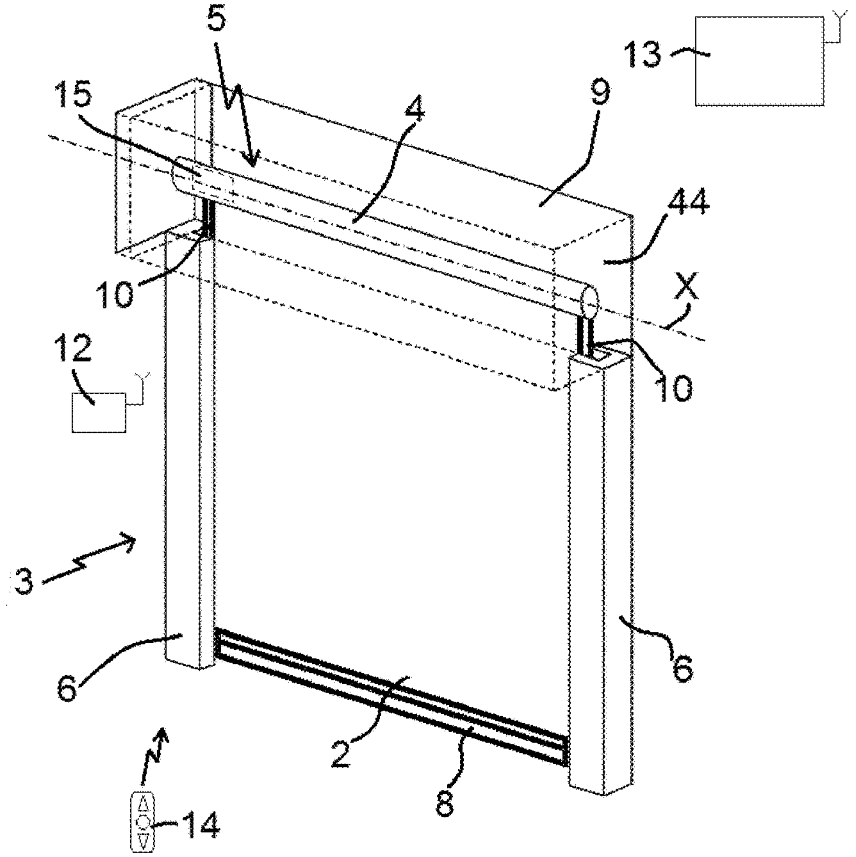
FIG. 2 is a schematic perspective view of the home-automation equipment illustrated in FIG. 1.

In reference to FIGS. 1 and 2, we will first describe home-automation equipment according to the invention and installed in a building comprising an opening 1, window or door, equipped with a screen 2 belonging to a concealing device 3, in particular a motorized windable blind.

The concealing device 3 may be a blind, in particular made from fabric, that is windable, pleated or with slats.

The concealing device 3 comprises a holding device 9, 23 of the screen 2.

A windable blind according to one embodiment of the invention will be described in reference to FIGS. 1 and 2.

The screen 2 of the concealing device 3 is wound on a winding tube 4 driven by a motorized drive device 5 and movable between a wound position, in particular an upper position, and an unwound position, in particular a lower position.

The moving screen 2 of the concealing device 3 is a closure, concealing and/or solar protection screen, winding on the winding tube 4, the inner diameter of which is generally substantially greater than the outer diameter of an electromechanical actuator 11, such that the electromechanical actuator 11 can be inserted into the winding tube 4 during the assembly of the concealing device 3.

The motorized drive device 5 comprises the electromechanical actuator 11, in particular of the tubular type, making it possible to set the winding tube 4 in rotation so as to unwind or wind the screen 2 of the concealing device 3.

The concealing device 3 comprises the winding tube 4 for winding the screen 2, where, in the mounted state, the electromechanical actuator 11 is inserted into the winding tube 4.

The concealing device 3 also comprises a load bar 8 for exerting tension on the screen 2.

In a known manner, the windable blind, which forms the concealing device 3, includes a fabric, forming the screen 2 of the windable blind 3. A first end of the screen 2, in particular the upper end of the screen 2 in the assembled configuration of the concealing device 3 in the home-automation equipment, is fastened to the winding tube 4. Additionally, a second end of the screen 2, in particular the lower end of the screen 2 in the assembled configuration of the concealing device 3 in the home-automation equipment, is fastened to the load bar 8.

Here, the fabric forming the screen 2 is made from a textile material.

In an example embodiment that is not shown, the first end of the screen 2 has an eyelet through which a rod is positioned, in particular made from plastic. This eyelet made at the first end of the screen 2 is obtained using a seam of the fabric forming the screen 2. During the assembly of the screen 2 on the winding tube 4, the eyelet and the rod situated at the first end of the screen 2 are inserted by sliding in a slot arranged on the outer face of the winding tube 4, in particular over the entire length of the winding tube 4, so as to be able to wind and unwind the screen 2 around the winding tube 4.

In the case of a windable blind, the high wound position corresponds to a predetermined high end-of-travel position, or to setting in support of the load bar 8 of the screen 2 against an edge of a housing 9 of the windable blind 3, and the low unwound position corresponds to a predetermined low end-of-travel position, or to the beginning of bearing of the load bar 8 of the screen 2 against a threshold 7 of the opening 1, or to complete unwinding of the screen 2.

The winding tube 4 is positioned inside the housing 9 of the windable blind 3. The screen 2 of the windable blind 3 winds and unwinds around the winding tube 4 and is housed at least partially inside the housing 9.

In general, the housing 9 is positioned above the opening 1, or in the upper part of the opening 1.

The housing 9 is an integral part of the holding device 9, 23 of the screen 2.

In one embodiment illustrated in FIG. 2, the screen 2 also includes, at each of its lateral edges, a fastening part 10 in the form of a strip. The fastening parts 10 form an overthickness at each lateral edge of the screen 2. The home-automation equipment comprises two lateral guideways 6 positioned along two lateral edges of the opening 1. The lateral guideways 6 additionally respectively comprise a groove inside which a fastening part 10 of the screen 2 is retained, as well as a lateral end of the load bar 8 fastened to the second end of the screen 2.

Thus, during the winding or unwinding of the screen 2, the fastening parts 10 fastened on the lateral edges of the screen 2 and the lateral ends of the load bar 8 fastened to the second end of the screen 2 are retained in the lateral guideways 6, so as to guarantee lateral guidance of the screen 2.

Each groove arranged in a lateral guideway 6 makes it possible to prevent the withdrawal of a fastening part 10 fixed on one of the lateral edges of the screen 2, during the movement of the screen 2 between the wound position and the unwound position.

Preferably, each fastening part 10 extends along the entire length of one of the two lateral edges of the screen 2.

In one example embodiment, the fastening parts 10 are respectively fastened at a lateral edge of the screen 2 by gluing, welding or overmolding. Additionally, the fastening parts 10 can be made from plastic and, in particular, overmolded on the lateral edges of the screen 2.

Here, the lateral guideways 6 respectively positioned along a lateral edge of the opening 1 extend along a vertical direction. The lateral guideways 6 extend from the threshold 7 of the opening 1 to the housing 9 of the windable blind 3.

Advantageously, trim elements, not shown, are positioned inside lateral guideways 6 and cooperate with the fastening parts 10 respectively fastened at a lateral edge of the screen 2, so as to keep the screen 2 stretched by applying a force on each fastening part 10 against a wall of the lateral guideway 6.

For example and non-limitingly, the trim elements positioned inside the lateral guideways 6 are provided with elastics, in particular made from plastic. The trim elements can also be provided in the form of foam or include a fly.

Thus, the trim elements positioned inside the lateral guideways 6 make it possible to guarantee the application of a frictional resistance on the fastening parts 10 of the screen 2, so as to keep the screen 2 stretched, during a movement of the screen 2 or when the screen 2 is kept stopped.

Advantageously, the housing 9 of the blind 3 and the side guideways 6 form a frame inside which the screen 2 can be moved. This frame can be closed by an additional bar connecting the two lateral guideways 6 at the threshold 7 of the opening 1.

The motorized drive device 5 is controlled by a control unit. The control unit may for example be a local control unit 12, where the local control unit 12 can be connected through a wired or wireless connection with a central control unit 13. The central control unit 13 drives the local control unit 12, as well as other similar local control units distributed throughout the building.

The central control unit 13 can be in communication with a weather station located outside the building, in particular including one or more sensors that can be configured for example to determine a temperature, brightness, or wind speed.

A remote control 14, which can be a type of local control unit, and provided with a control keypad, which comprises selection and display means, further allows a user to intervene on the electromechanical actuator 11 and/or the central control unit 13.

The motorized drive device 5 is preferably configured to carry out the unwinding or winding commands of the screen 2 of the concealing device 3, which may in particular be acquired by the remote control 14.

Figure 3:
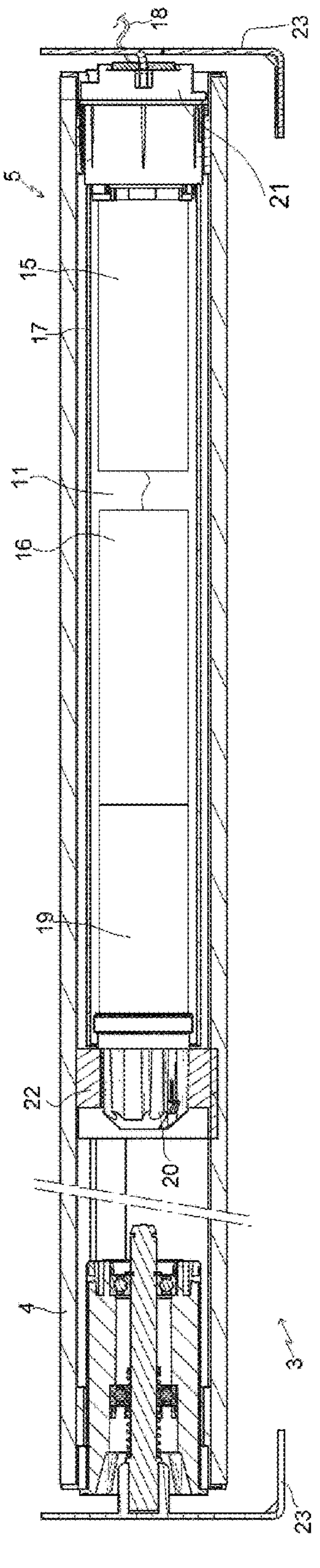
FIG. 3 is an axial and partial schematic sectional view of the home-automation equipment illustrated in FIGS. 1 and 2, showing an electromechanical actuator of this equipment.

The electromechanical actuator 11 belonging to the home-automation equipment of FIGS. 1 and 2 will now be described in reference to FIG. 3.

The electromechanical actuator 11 comprises an electric motor 16. The electric motor 16 comprises a rotor and a stator, not shown and positioned coaxially around a rotation axis X, which is also the rotation axis of the winding tube 4 in the assembled configuration of the motorized drive device 5.

Control means for controlling the electromechanical actuator 11, making it possible to move the screen 2 of the concealing device 3, comprise at least one electronic control unit 15. This electronic control unit 15 is able to operate the electric motor 16 of the electromechanical actuator 11, and in particular to allow the supply of electrical energy for the electric motor 16.

Thus, the electronic control unit 15 in particular controls the electric motor 16, so as to open or close the screen 2, as previously described.

The electronic control unit 15 also comprises a module for receiving control orders, the control orders being sent by an order transmitter, such as the remote control 14 designed to control the electromechanical actuator 11 or one of the local 12 or central 13 control units.

Preferably, the control orders receiving module of the electronic control unit 15 is of the wireless type. In particular, the control orders receiving module is configured to receive radio control orders.

The control orders receiving module can also allow the reception of control orders sent by wired means.

The control means of the electromechanical actuator 11 comprise hardware and/or software means.

As one non-limiting example, the hardware means may comprise at least one microcontroller.

The electromechanical actuator 11 is supplied with electrical energy by a battery 24. The electromechanical actuator 11 makes it possible to move the screen 2 of the concealing device 3.

Here, the electromechanical actuator 11 comprises a power supply cable 18 making it possible to supply electrical energy from the battery 24.

The casing 17 of the electromechanical actuator 11 is preferably cylindrical.

In one embodiment, the casing 17 is made from a metal material.

The material of the casing of the electromechanical actuator is in no way limiting and may be different, and in particular made from plastic.

The electromechanical actuator 11 also comprises a reducing gear device 19 and an output shaft 20.

The electromechanical actuator 11 may also comprise an end-of-travel and/or obstacle detection device, which may be mechanical or electronic.

Advantageously, the electric motor 16 and the reducing gear device 19 are positioned inside the casing 17 of the electromechanical actuator 11.

The output shaft 20 of the electromechanical actuator 11 is positioned inside the winding tube 4, and at least partially outside the casing 17 of the electromechanical actuator 11.

The output shaft 20 of the electromechanical actuator 11 is coupled by a connecting means 22 to the winding tube 4, in particular using a wheel-shaped connecting means.

The electromechanical actuator 11 also comprises a closing off element 21 for one end of the casing 17.

Here, the casing 17 of the electromechanical actuator 11 is fastened to a support 23, in particular a flange, of the housing 9 of the concealing device 3 using the closing off element 21 forming a torque pin, in particular a closing off and torque-reacting head. In such a case where the closing off element 21 forms a torque pin, the closing off element 21 is also called a fixed point of the electromechanical actuator 11.

The support 23 is also an integral part of the holding device 9, 23 of the screen 2. Here and as illustrated in FIG. 3, the electronic control unit 15 is positioned inside the casing 17 of the electromechanical actuator 11.

Thus, the electronic control unit 15 is incorporated inside the casing 17 of the electromechanical actuator 11.

In another embodiment, the electronic control unit 15 is positioned outside the casing 17 of the electromechanical actuator 11, and in particular, mounted on the support 23, in the closing off element 21 or in the housing 9.

Certain parts of the concealing device 3 will now be described in reference to FIGS. 4 to 7.

The load bar 8 of the concealing device 3 comprises a lower wall 40, an upper wall 41 and two side walls 42, in the assembled configuration of the concealing device 3.

Figure 4:
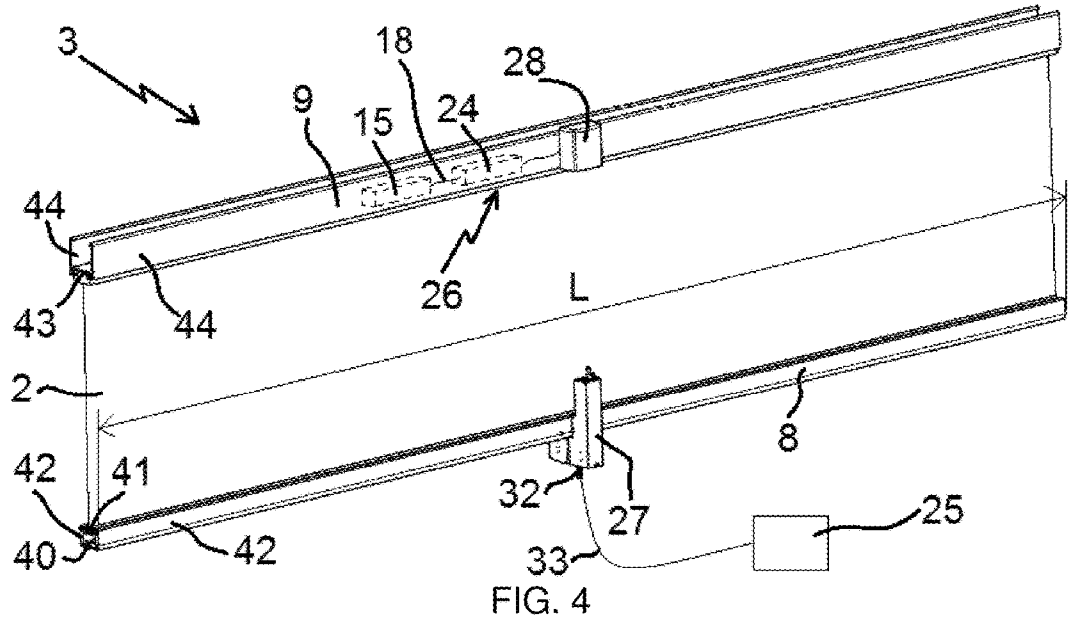
FIG. 4 is a schematic perspective view of a concealing device belonging to the home-automation equipment illustrated in FIGS. 1 to 3 and comprising an autonomous electrical energy supply device.

The housing 9 of the concealing device 3 comprises a lower wall 43, an upper wall, not shown in FIG. 4 but visible in FIG. 2, and two side walls 44, in the assembled configuration of the concealing device 3. For the clarity of the drawing, the lower wall 43 is not shown in FIG. 2.

The concealing device 3 comprises an autonomous electrical energy supply device 26, in that it makes it possible to power the electromechanical actuator 11, without itself being connected to the sector grid. The electromechanical actuator 11 is electrically connected to the autonomous electrical energy supply device 26.

The autonomous electrical energy supply device 26 comprises the battery 24. The battery 24 is positioned at the holding device 9, 23 of the screen 2 and, more particularly, of the housing 9 of the concealing device 3.

Here, the battery 24 is positioned inside the housing 9.

Alternatively, the battery 24 is positioned outside the housing 9.

Here and as illustrated in FIG. 4, the battery 24 is directly electrically connected to the electronic control unit 15 by the power supply cable 18.

Advantageously, the motorized drive device 5 and, in particular the electronic control unit 15, comprises charging elements configured to charge the battery 24 from the electrical energy supplied by an external electrical supply source 25.

Here, the battery 24 is of the rechargeable type and supplies electric energy to the electromechanical actuator 11.

The battery 24 comprises one or several energy storage elements. The energy storage elements of the battery 24 can in particular be rechargeable cells.

The autonomous electrical energy supply device 26 comprises a first electrical connection element 27 and a second electrical connection element 28.

The first electrical connection element 27 is positioned at the load bar 8 of the concealing device 3.

The first electrical connection element 27 is configured to be connected to an external electrical supply source 25, so as to recharge the battery 24.

As one non-limiting example, the external electrical supply source 25 is a charger able to be connected on a wall outlet, so as to recharge the battery 24 from an electric supply grid.

In practice, the first electrical connection element 27 comprises an electrical connector 31.

Here, the electrical connector 31 of the first electrical connection element 27 is configured to cooperate with an electrical connector 32 connected by a power supply cable 33 to the external electrical supply source 25.

The second electrical connection element 28 is positioned at the holding device 9, 23 of the screen 2 and, more particularly, of the housing 9 of the concealing device 3.

The second electrical connection element 28 cooperates with the first electrical connection element 27 only when the screen 2 is in a recharging position of the battery 24, so as to establish an electrical connection between the first electrical connection element 27 and the battery 24.

The recharging position of the battery 24 corresponds either to the high position of the screen 2 or to a position of the screen 2 where the load bar 8 is close to the holding device 9, 23 of the screen 2.

According to the present invention, it may be considered that the load bar 8 is close to the holding device 9, 23 when the load bar 8 is situated above the opening 1.

Thus, the electrical connection between the first electrical connection element 27 and the battery 24 is implemented only when the first electrical connection element 27 is positioned near the second electrical connection element 28, so as to be able to recharge the battery 24.

In this way, the electrical connection between the first electrical connection element 27 and the battery 24 is implemented without a power supply cable connecting the first electrical connection element 27 to the second electrical connection element 28, so as to guarantee the reliability of this electrical connection and to minimize the costs of obtaining the home-automation equipment.

Furthermore, the positioning of the first electrical connection element 27 at the load bar 8 of the concealing device 3 makes it possible to facilitate, for the user, the electrical connection of the external electrical supply source 25 to the first electrical connection element 27, since this electrical connection between the first electrical connection element 27 and the external electrical supply source 25 can be done when the screen 2 of the concealing device 3 is in the low position.

Moreover, the battery 24 can be recharged without having to disassemble part of the home-automation equipment and, in particular, the holding device 9, 23 of the screen 2, in particular of the housing 9 of the concealing device 3.

Advantageously, the recharging position of the battery 24 can be determined during the installation of the concealing device 3 and, in particular, during the learning of the high and low end-of-travel positions of the screen 2.

In one example embodiment, the recharging position of the battery can be determined as being reached owing to a metering device, in particular counting the number of revolutions of the output shaft 20 of the electromechanical actuator 11, or the operating time of the electromechanical actuator 11.

Alternatively, the recharging position of the battery can be determined as being reached using the device detecting the end of travel and/or an obstacle of the electromechanical actuator 11.

Figure 5:
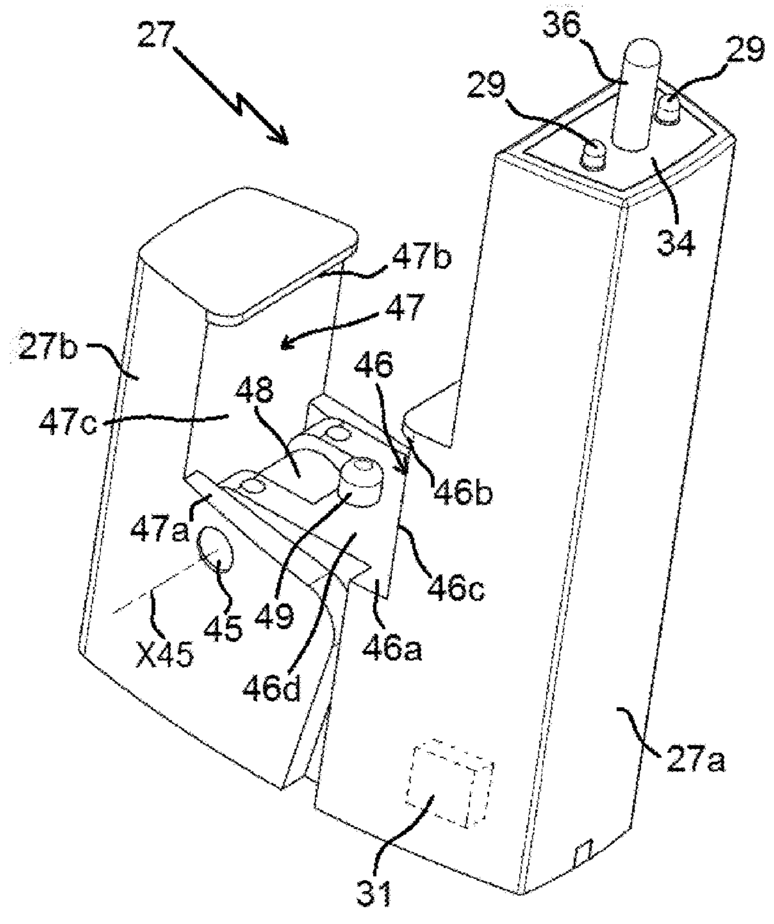
FIG. 5 is a schematic perspective view of a first electrical connection element of the autonomous electrical energy supply device illustrated in FIG. 4.
Figure 6:
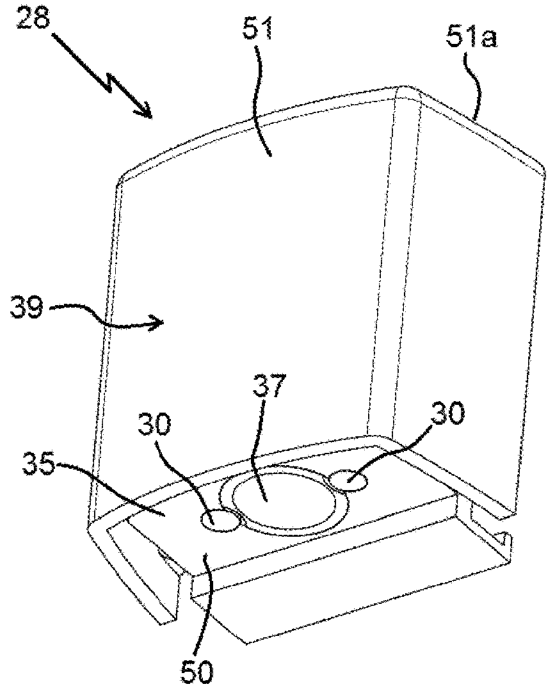
FIG. 6 is a schematic perspective view of a second electrical connection element of the autonomous electrical energy supply device illustrated in FIG. 4.
Figure 7:
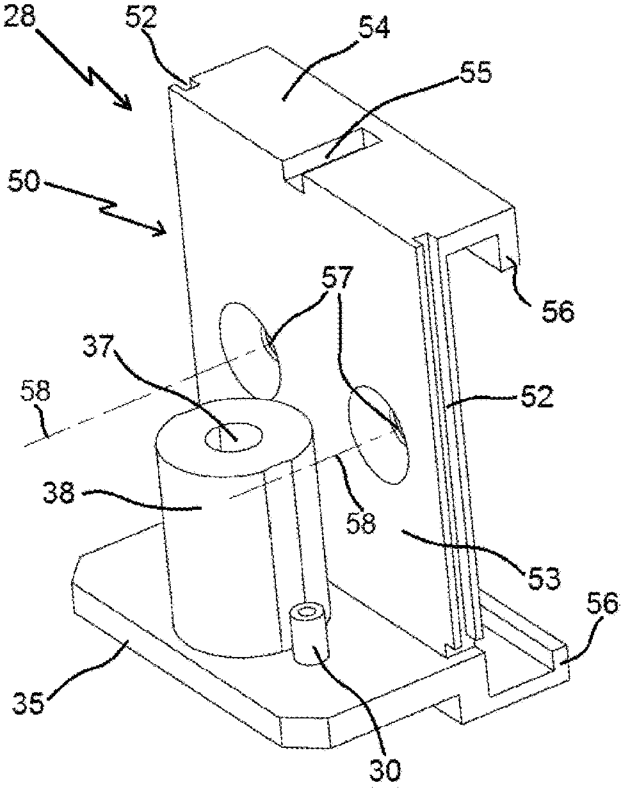
FIG. 7 is a schematic view similar to FIG. 6 and from another angle, where a cover of the second electrical connection element has been removed.

In a first embodiment, as illustrated in FIGS. 5 to 7, the first and second electrical connection elements 27, 28 comprise electrical contact elements 29, 30, so as to establish electrical conduction between the first and second electrical connection elements 27, 28, when the screen 2 is in the recharging position of the battery 24.

Thus, the electrical connection between the first electrical connection element 27, positioned at the load bar 8, and the battery 24, positioned at the holding device 9, 23 of the screen 2, is implemented only when the first electrical connection element 27 is pressed against the second electrical connection element 28.

In this way, the electrical connection between the first electrical connection element 27 and the battery 24 is implemented only when the screen 2 is in the recharging position of the battery 24.

The electrical connection between the first and second electrical connection elements 27, 28 is interrupted once the screen 2 is in a position different from the recharging position of the battery 24.

Here, the recharging position of the battery 24 is defined by the setting in support of the electrical contact elements 29 of the first electrical connection element 27 with the electrical contact elements 30 of the second electrical connection element 28.

Preferably, the recharging position of the battery 24 is determined as being reached when the electrical contact elements 29 of the first electrical connection element 27 are placed in contact with the electrical contact elements 30 of the second electrical connection element 28, so as to send a signal to the electronic control unit 15.

Thus, following reception of this signal by the electronic control unit 15, the latter emits a control order to stop the electromechanical actuator 11.

In this way, the movement of the first electrical connection element 27 relative to the second electrical connection element 28 is controlled by the electronic control unit 15 and, more particularly, by the movement of the screen 2 through the electromechanical actuator 11.

In the example embodiment illustrated in FIGS. 5 to 7, the first electrical connection element 27 comprises two electrical contact elements 29. Furthermore, the second electrical connection element 28 comprises two electrical contact elements 30.

The electrical contact elements 29 of the first electrical connection element 27 cooperate with the electrical contact elements 30 of the second electrical connection element 28, when the screen 2 is in the recharging position of the battery 24.

Here, the electrical contact elements 29, 30 of the first and second electrical connection elements 27, 28 are electrical connection studs. Each electrical connection stud 29 comprises an electrical contact surface cooperating with an electrical contact surface of one of the electrical connection studs 30.

Here, the electrical contact elements 29 of the first electrical connection element 27 are positioned at an upper part 34 of the first electrical connection element 27 and the electrical contact elements 30 of the second electrical connection element 28 are positioned at a lower wall 35 of the second electrical connection element 28, in the assembled configuration of the concealing device 3.

In practice, the electrical contact elements 30 of the second electrical connection element 28 are electrically connected to the battery 24 using electrical supply wires, not shown.

In a second embodiment, not shown, the first and second electrical connection elements 27, 28 comprise coils, so as to establish electromagnetic coupling between the first and second electrical connection elements 27, 28, when the screen 2 is in the recharging position of the battery 24.

Thus, the electrical connection between the first electrical connection element 27 and the battery 24 is implemented only when the first electrical connection element 27 is positioned at a distance from the second electrical connection element 28 smaller than or equal to a maximum threshold value.

This maximum threshold value depends on the coils and may be about several millimeters, so as to guarantee the electromagnetic coupling between the first and second electrical connection elements 27, 28.

In this way, the electrical connection between the first electrical connection element 27 and the battery 24 is implemented only when the screen 2 is substantially in the high position.

The positioning of the first and second electrical connection elements 27, 28 comprising coils makes it possible to form a transformer, so as to conduct the electrical energy from the first electrical connection element 27 toward the second electrical connection element 28.

The electromagnetic coupling between the first and second electrical connection elements 27, 28 is interrupted once the screen 2 is in a position different from the recharging position of the battery 24, where the distance between the first and second electrical connection elements 27, 28 is greater than the threshold value.

Here, the recharging position of the battery 24, corresponding to the position of the screen 2 where the load bar 8 is close to the holding device 9, 23 of the screen 2, is defined by the positioning of the coil of the first electrical connection element 27 relative to the coil of the second electrical connection element 28, so as to establish the electromagnetic coupling between the first and second electrical connection elements 27, 28.

Preferably, the first electrical connection element 27 comprises a centering element 36, in particular a centering pin, cooperating with a centering element 37 of the second electrical connection element 28, in particular an opening in the second electrical connection element 28, so as to center the first electrical connection element 27 relative to the second electrical connection element 28, in the assembled configuration of the concealing device 3 and when the screen 2 is in the recharging position of the battery 24.

Thus, the first electrical connection element 27 is positioned relative to the second electrical connection element 28 by introducing the centering pin 36 of the first electrical connection element 27 into the opening 37 of the second electrical connection element 28.

In this way, this positioning of the first electrical connection element 27 relative to the second electrical connection element 28 makes it possible to guarantee the electrical contact between the electrical contact elements 29 of the first electrical connection element 27 and the electrical contact elements 30 of the second electrical connection element 28, when the screen 2 is in the high position.

Here, the centering pin 36 of the first electrical connection element 27 is positioned at the upper wall 34 of the first electrical connection element 27 and the opening 37 of the second electrical connection element 28 is positioned at the lower wall 35 of the second electrical connection element 28, in the assembled configuration of the concealing device 3.

Furthermore, the centering pin 36 of the first electrical connection element 27 is positioned between the two electrical contact elements 29 of the first electrical connection element 27 and the opening 37 of the second electrical connection element 28 is positioned between the two electrical contact elements 30 of the second electrical connection element 28.

Advantageously, the opening 37 of the second electrical connection element 28 is arranged through the lower wall 35 of the second electrical connection element 28 and through a barrel 38 extending from the lower wall 35 of the second electrical connection element 28 toward the inside of a housing 39 formed by the second electrical connection element 28, as illustrated in FIG. 7.

Thus, the centering pin 36 of the first electrical connection element 27 is guided inside the opening 37 of the second electrical connection element 28 by the barrel 38, when the centering pin 36 of the first electrical connection element 27 is inserted into the opening 37 of the second electrical connection element 28.

We will now describe the first electrical connection element 27 positioned at the load bar 8 in more detail, in reference to FIG. 5.

Advantageously, the first electrical connection element 27 is mounted on the load bar 8 of the concealing device 3 by fastening elements 46, 47.

Preferably, the fastening elements 46, 47 of the first electrical connection element 27 on the load bar 8 of the concealing device 3 are holding elements bearing on the walls 40, 41, 42 of the load bar 8.

Here, the first electrical connection element 27 comprises a first part 27*a* and a second part 27*b*. The second part 27*b* is movable relative to the first part 27*a*.

As illustrated in FIG. 5, the upper wall 34 belongs to the first part 27*a* of the first electrical connection element 27.

The second part 27*b* of the first electrical connection element 27 is rotatable relative to the first part 27*a* of the first electrical connection element 27 around a rotation axis X45 embodied by a shaft 45.

The first and second parts 27*a*, 27*b* of the first electrical connection element 27 are positioned on either side of the load bar 8.

The first and second parts 27*a*, 27*b* of the first electrical connection element 27 respectively comprise a recess 46, 47 cooperating with the load bar 8. The recesses 46, 47 are an integral part of the fastening elements of the first electrical connection element 27 on the load bar 8.

Thus, when the first electrical connection element 27 is mounted on the load bar 8, the respective recess 46, 47 of the first or second part 27*a*, 27*b* of the first electrical connection element 27 is placed bearing against the outer contour of the load bar 8.

In this way, the respective recesses 46, 47 of the first and second parts 27*a*, 27*b* of the first electrical connection element 27 make it possible to mount the first electrical connection element 27 on the load bar 8 like a clamp.

The recess 46 of the first part 27*a* of the first electrical connection element 27 comprises a lower wall 46*a*, an upper wall 46*b* and a side wall 46*c*. Likewise, the recess 47 of the second part 27*b* of the first electrical connection element 27 comprises a lower wall 47*a*, an upper wall 47*b* and a side wall 47*c*.

In the assembled configuration of the first electrical connection element 27 on the load bar 8, the lower walls 46*a*, 47*a* of the recesses 46, 47 are placed bearing against the lower wall 40 of the load bar 8 and the upper walls 46*b*, 47*b* of the recesses 46, 47 are placed bearing against the upper wall 41 of the load bar 8.

Furthermore, the side wall 46*c* of the recess 46 is placed bearing against a first side wall 42 of the load bar 8 and the side wall 47*c* of the recess 47 is placed bearing against a second side wall 42 of the load bar 8.

The first side wall 42 of the load bar 8 is positioned vis-a-vis the second side wall 42 of the load bar 8.

Preferably, the first and second parts 27*a*, 27*b* of the first electrical connection element 27 are kept bearing on walls 40, 41, 42 of the load bar 8 using an elastic return element 48.

Thus, the elastic return element 48 tends to hold the second part 27*b* of the first electrical connection element 27 relative to the first part 27*a* of this first electrical connection element 27 in a gripping position.

In this way, in the assembled configuration of the first electrical connection element 27 on the load bar 8, the first and second parts 27*a*, 27*b* of the first electrical connection element 27 are kept bearing on the walls 40, 41, 42 of the load bar 8 by applying force exerted by the elastic return element 48 and, in particular, by at least partial overlapping of the outer contour of the load bar 8 by the recesses 46, 47 of the first and second parts 27*a*, 27*b* of the first electrical connection element 27.

Advantageously, the elastic return element 48 is mounted around the shaft 45, so as to keep the first and second parts 27*a*, 27*b* of the first electrical connection element 27 in the gripped position.

Here and non-limitingly, the elastic return element 48 is a spiral spring.

Here, the first electrical connection element 27 is removable relative to the load bar 8.

In another example embodiment, the fastening elements of the first electrical connection element 27 on the load bar 8 of the concealing device 3 can be replaced by magnets, fastening screws, or fastening elements using elastic snapping.

Alternatively, the first electrical connection element 27 can be fastened on the load bar 8 non-removably.

In such a case, the fastening elements of the first electrical connection element 27 on the load bar 8 of the concealing device 3 can be rivets.

Furthermore, the first electrical connection element 27 can be rotatable on the load bar 8, in particular using a rotation shaft connecting the first electrical connection element 27 to the load bar 8, such that this first electrical connection element 27 is articulated relative to the load bar 8.

Advantageously, the first electrical connection element 27 comprises a centering element 49, in particular a centering stud, cooperating with a centering element of the load bar 8, in particular an opening, not shown, arranged in the load bar 8, in particular in its lower portion 40, so as to position the first electrical connection element 27 relative to the load bar 8 and to center the first electrical connection element 27 relative to the second electrical connection element 28, in the assembled configuration of the concealing device 3.

Thus, the first electrical connection element 27 is positioned on the load bar 8 by inserting the centering stud 49 of the first electrical connection element 27 into the opening of the load bar 8, in particular along the length L of the load bar 8.

In this way, the first electrical connection element 27 is centered relative to the second electrical connection element 28, in particular along the width of the concealing device 3.

Here, the centering stud 49 of the first electrical connection element 27 is arranged on a wall 46*d* extending in the extension of the lower wall 46*a* of the recess 46 of the first part 27*a* of the first electrical connection element 27.

The second electrical connection element 28 positioned at the holding device 9, 23 of the screen 2 and, more particularly, of the housing 9, will now be described in more detail in reference to FIGS. 6 and 7.

Here, the second electrical connection element 28 comprises a support 50 and a cover 51. The support 50 and the cover 51 form the housing 39 of the second electrical connection element 28.

The cover 51 is mounted on the support 50 by holding elements.

Advantageously, the holding elements of the cover 51 on the support 50 are sliding elements.

In practice, the holding elements of the support 50 comprise a slot 52 arranged on either side of a front wall 53. Additionally, the slots 52 of the front wall 53 of the support 50 cooperate with ribs, not shown, arranged on the cover 51, in particular on the inner face of the cover 51, so as to allow sliding of the cover 51 on the support 50.

Additionally, the cover 51 is kept in position on the support 50 by the bearing of an upper wall 51*a* of the cover 51 with an end of the front wall 53 of the support 50, and optionally an upper wall 54 of the support 50, in the assembled configuration of the second electrical connection element 28 on the housing 9.

Advantageously, the support 50 comprises a slit 55 arranged at one end of the front face 53 of the support 50, and optionally at the upper wall 54 of the support 50, cooperating with a rib, not shown, arranged on the inner face of the upper wall 51*a* of the cover 51, so as to guarantee the centering of the cover 51 relative to the support 50.

Advantageously, the second electrical connection element 28 is positioned mounted on the holding device 9, 23 of the screen 2 and, more particularly, on the housing 9 of the concealing device 3 by fastening elements 56, 57.

Preferably, the fastening elements 56, 57 of the second electrical connection element 28 on the holding device 9, 23 of the screen 2 and, more particularly, on the housing 9 of the concealing device 3 are fastening elements 56 by elastic snapping.

In practice, the fastening elements 56 by elastic snapping of the second electrical connection element 28 cooperate with a side wall 44 of the housing 9 and, more particularly, bear against an upper border of the side wall 44 of the housing 9 and a lower border of this side wall 44.

Here, the fastening by elastic snapping of the second electrical connection element 28 on the side wall 44 of the housing 9 is implemented by an elastic deformation of the support 50 and by the placement of tabs 56 of the support 50 on the one hand, against the upper border of the side wall 44 of the housing 9 and, on the other hand, in a slit, not shown, arranged in the lower wall 43 of the housing 9.

Moreover, the fastening elements 56, 57 of the second electrical connection element 28 on the holding device 9, 23 of the screen 2 and, more particularly, on the housing 9 of the concealing device 3 can also comprise fastening elements 57 by screwing.

In such a case, the second electrical connection element 28 comprises passage holes 57 for fastening screws and the housing 9 comprises holes, not shown, for receiving fastening screws. In FIG. 7, the fastening screws are shown by their respective axis lines 58.

Here, the fastening screw passage holes 57 are arranged in the front wall 53 of the support 50 and the fastening screw receiving holes are arranged in a side wall 44 of the housing 9.

Here, the second electrical connection element 28 comprises two fastening screw passage holes 57. The number of fastening screw passage holes 57 arranged in the second electrical connection element 28 is non-limiting and may be different, in particular equal to one or strictly greater than two.

Here, the support 50 of the second electrical connection element 28 comprises the hub 38 extending from the lower wall 35 of the second electrical connection element 28, through which the centering pin 36 of the first electrical connection element 27 is inserted, when the screen 2 is in the recharging position of the battery 24.

We will now describe a method for recharging the battery 24 according to one embodiment of the invention.

The method for recharging the battery 24 comprises at least the following steps, preferably carried out in the order stated below:

- lowering the screen 2 toward the low position,
- connecting an external electrical supply source 25 on the first electrical connection element 27 positioned at the load bar 8 of the concealing device 3,
- raising the screen 2 to the recharging position of the battery 24, and
- making an electrical connection between the first and second electrical connection elements 27, 28, so as to supply electrical energy to the battery 24 from the external electrical supply source 25.

Owing to the present invention, the electrical connection between the first electrical connection element, positioned at the load bar of the concealing device, and the battery, positioned at the holding device of the screen, is implemented only when the first electrical connection element is positioned near the second electrical connection element, so as to be able to recharge the battery.

In this way, the electrical connection between the first electrical connection element and the battery is implemented without a power supply cable connecting the first electrical connection element to the second electrical connection element, so as to guarantee the reliability of this electrical connection and to minimize the costs of obtaining the home-automation equipment.

Of course, many changes can be made to the example embodiments previously described without going beyond the scope of the invention defined by the claims.

In particular, centering means, like the centering pin 36 and the opening 37, can also be used in the second embodiment where the first and second electrical connection elements 27, 28 comprise coils.

In another example embodiment, not shown, the external electrical supply source 25 is a battery, able to be fixed removably on the load bar 8 of the concealing device 3, so as to recharge the battery 24 positioned at the holding device 9, 23 of the screen 2.

Thus, the battery 24 positioned at the holding device 9, 23 of the screen 2 can be recharged using the battery forming the external electrical supply source 25, in particular when the concealing device 3 is far away from a wall outlet.

In this case, the electrical connector 31 of the first electrical connection element 27 is configured to cooperate with an electrical connector 32 of the battery forming the external electrical supply source 25.

In practice, the fastening elements of the battery forming the external electrical supply source 25 on the load bar 8 are elastic snapping elements.

Furthermore, the battery forming the external electrical supply source 25 and intended to cooperate with the first electrical connection element 27 can make it possible to recharge the battery of other electrical equipment, in particular roaming, for example a mobile telephone or a laptop computer.

Furthermore, such a battery forming the external electrical supply source 25 may have at least two electrical outlets, in particular a first outlet delivering a voltage of 12 volts to electrically supply the battery 24 positioned at the holding device 9, 23 of the screen 2 and a second outlet delivering a voltage of 5 volts to electrically supply other electrical equipment, so-called roaming.

Advantageously, the battery forming the external electrical supply source 25 can be used to recharge a plurality of batteries 24 respectively positioned at a separate holding device 9, 23 of the screen 2.

Furthermore, the considered embodiments and alternatives may be combined to generate new embodiments of the invention, without going beyond the scope of the invention defined by the claims.

The invention claimed is:

1. A home-automation equipment for closure or solar protection comprising:
- a concealing device comprising at least:
  - a screen,
  - a support configured to hold the screen, a first end of the screen being positioned at the support configured to hold the screen,
  - a load bar, a second end of the screen being fastened to the load bar,
  - a motorized drive device, and
  - an autonomous electrical energy supply device,
  - the motorized drive device comprising at least:
    - an electromechanical actuator configured to raise and lower the screen, between a high position and a low position, the electromechanical actuator being electrically connected to the autonomous electrical energy supply device,
  - the autonomous electrical energy supply device comprising at least:
  - a battery positioned at the support configured to hold the screen,
  - a first electrical connection element positioned at the load bar of the concealing device, the first electrical connection element being configured to be connected to an external electrical supply source, to recharge the battery, and
  - a second electrical connection element positioned at the support configured to hold the screen,
  - wherein the second electrical connection element cooperates with the first electrical connection element only when the screen is in a recharging position of the battery, the recharging position of the battery corresponding either to the high position of the screen or to a position of the screen where the load bar is near the support configured to hold the screen, to establish an electrical connection between the first electrical connection element positioned at the load bar and the battery positioned at the support configured to hold the screen.

2. The home-automation equipment for closure or solar protection according to claim 1, wherein the first and second electrical connection elements comprise electrical contact elements, so as to establish electrical conduction between the first and second electrical connection elements, when the screen is in the recharging position of the battery.

3. The home-automation equipment for closure or solar protection according to claim 1, wherein the first and second electrical connection elements comprise coils, so as to establish electromagnetic coupling between the first and second electrical connection elements, when the screen is in the recharging position of the battery.

4. The home-automation equipment for closure or solar protection according to claim 1, wherein the first electrical connection element is mounted on the load bar of the concealing device by fastening devices selected from one of recesses, magnets, fastening screws, elastic snap fasteners, and rivets.

5. The home-automation equipment for closure or solar protection according to claim 4, wherein the fastening elements of the first electrical connection element on the load bar of the concealing device are selected from one of recesses, magnets, fastening screws, elastic snap fasteners, and rivets and bear against an outer contour of the load bar.

6. The home-automation equipment for closure or solar protection according to claim 1, wherein the first electrical connection element comprises a first part and a second part, the second part being movable relative to the first part.

7. The home-automation equipment for closure or solar protection according to claim 6, wherein the first and second parts of the first electrical connection element respectively comprise a recess cooperating with the load bar, the recesses of the first and second parts of the first electrical connection element forming at least part of fastening elements of the first electrical connection element on the load bar of the concealing device.

8. The home-automation equipment for closure or solar protection according to claim 6, wherein the first and second parts of the first electrical connection element are kept bearing on walls of the load bar using a spring.

9. The home-automation equipment for closure or solar protection according to claim 1, wherein the first electrical connection element comprises a centering element selected from one of a pin, a stud, and an opening, and cooperating with a centering element of the second electrical connection element selected from one of a pin, a stud, and an opening, to center the first electrical connection element relative to the second electrical connection element, in an assembled configuration of the concealing device and when the screen is in the recharging position of the battery.

10. The home-automation equipment for closure or solar protection according to claim 1, wherein the first electrical connection element comprises a centering element selected from one of a pin, a stud, and an opening, and cooperating with a centering element of the load bar selected from one of a pin, a stud, and an opening, to position the first electrical connection element relative to the load bar and to center the first electrical connection element relative to the second electrical connection element, in an assembled configuration of the concealing device.

11. The home-automation equipment for closure or solar protection according to claim 1, wherein the support configured to hold the screen belongs to a housing.

12. A method for recharging the battery for the home-automation equipment for closure or solar protection according to claim 1, wherein said method comprises:

lowering the screen toward the low position;

connecting the external electrical supply source on the first electrical connection element;

raising the screen to the recharging position of the battery; and making an electrical connection between the first and second electrical connection elements, to supply electrical energy to the battery from the external electrical supply source.

* * * * *